United States Patent [19]

Hayashi et al.

[11] Patent Number: 5,075,790
[45] Date of Patent: Dec. 24, 1991

[54] METHOD FOR ORIENTING LIQUID CRYSTAL DISPLAY ELEMENT BY RUBBING

[75] Inventors: Yuzo Hayashi; Tetuo Shiraiwa, both of Iwaki, Japan

[73] Assignee: Alps Electric Co., Ltd., Tokyo, Japan

[21] Appl. No.: 583,529

[22] Filed: Sep. 17, 1990

[30] Foreign Application Priority Data

Oct. 26, 1989 [JP] Japan ................................ 1-277036
Mar. 15, 1990 [JP] Japan ................................ 2-62743

[51] Int. Cl.5 .................................................. G02F 1/13
[52] U.S. Cl. ...................................................... 359/76
[58] Field of Search .................................. 350/340, 341

[56] References Cited

U.S. PATENT DOCUMENTS

| 4,030,997 | 6/1977 | Miller et al. | 350/340 |
| 4,192,060 | 3/1980 | Waskizuka et al. | 350/340 |
| 4,232,947 | 11/1980 | Funada et al. | 350/341 |
| 4,869,577 | 9/1989 | Masaki | 350/340 |

FOREIGN PATENT DOCUMENTS

| 0098723 | 7/1980 | Japan | 350/341 |
| 0052720 | 5/1981 | Japan | 350/341 |
| 0056817 | 4/1982 | Japan | 350/341 |
| 0156721 | 6/1989 | Japan | 350/341 |

Primary Examiner—Stanley D. Miller
Assistant Examiner—Huy K. Mai
Attorney, Agent, or Firm—Guy W. Shoup; David W. Heid

[57] ABSTRACT

Disclosed is a method for orienting and processing a liquid cristal display element by rubbing, comprising: forming an orienting film for covering a transparent electrode on a substrate, thereafter rotating on the substrate a roller having a rubbing material wound on the outer peripheral surface thereof with a number of fibers stood upright, and therby rubbing the orienting film with the fibers. The upright direction of the fibers with respect to the outer peripheral surface of the roller is inclined in the rotational direction of the roller.

2 Claims, 2 Drawing Sheets

METHOD FOR ORIENTING LIQUID CRYSTAL DISPLAY ELEMENT BY RUBBING

BACKGROUND OF THE INVENTION

1. Field of the Invention

The present invention relates to a method for orienting and processing a liquid crystal display element (hereinafter abridged as LCD).

2. Description of the Prior Art

As one method for orienting liquid crystal particles in an LCD cell in a specific direction, there is a rubbing method. This rubbing method is an orienting and processing method which comprises rubbing in a specific direction an orienting film for coating a transparent electrode on a glass substrate by use of a rubbing material during production of LCD.

That is, as shown in FIG. 4, a transparent electrode 2 is formed on a glass substrate 1. An orienting film 3 is formed on the transparent electrode 2. Thereafter, a cylindrical roller 5 having a rubbing material 4 wound on the outer peripheral surface thereof with a number of fibers 4a standing upright is rotated at a high speed and at the same time, the surface of the orienting film 3 is subjected to rubbing in a specific direction. Then, the long axis of liquid crystal particles is oriented in a direction parallel with the rubbing direction. As the rubbing material 4 used for such orienting and processing by rubbing, raising clothes have been generally used in which the surface of the cloth obtained by weaving cotton, nylon fibers and the like is raised.

In the rubbing material 4 heretofore used, a number of fibers 4a are standing approximately vertically upright on the surface, as shown in FIG. 5. The orienting film 3 is subjected to rubbing at the tips of these fibers 4a. When the rubbing material 4 having such a construction as described above is used, deep and large scratches were liable to be produced in the surface of the orienting film 3 though there is somewhat difference according to kinds. Such deep and large scratches bring forth an unevenness of orientation particularly in a so-called S-TN (Super-Twisted) type LCD in which a twisting angle of a liquid crystal is set to 180° or more. The scratches comprise an obstacle in providing high duty and larger display surface.

SUMMARY OF THE INVENTION

It is therefore an object of the present invention to overcome the task involved in prior art and provide a method for orienting and processing LCD by rubbing which can always carry out satisfactory orienting and processing and avoid an unevenness of orientation.

For achieving the aforesaid object, according to the present invention, there is provided a method which comprises forming an orienting film for covering a transparent electrode on a substrate, thereafter rotating on said substrate a roller having a rubbing material wound on the outer peripheral surface thereof with a number of fibers standing upright, and thereby rubbing said orienting film with said fibers, the upright direction of said fibers with respect to the outer peripheral surface of said roller being inclined in the rotational direction of said roller.

The present inventors have contemplated that deep and large scractched formed in the orienting film during rubbing resulted from the fact that the tips of the fibers 4a of the rubbing material 4 were drawn long on the orienting film 3. The tips of the fibers 4a stand upright approximately vertically with respect to the outer peripheral surface of the roller 5 and are flexed in the counter rotational direction when the roller 5 is rotated at a high speed in the direction as indicated by the arrow. Therefore, when the orienting film 3 is intended to be positively rubbed by the tips of the fibers 4a, the sliding distance on the orienting film 3 unavoidably becomes long, and as a result, the contact pressure tends to be excessively increased and deep and large scratches are expected to be produced.

When the upright direction of the fibers of the rubbing material is inclined as in the aforementioned means, only the tips of the fibers can be positively slidably moved on the orienting film, and the sliding distance becomes short to render possible rubbing under moderate contact pressure.

BRIEF DESCRIPTION OF THE DRAWINGS

FIG. 1 is an explanatory view showing the process for orientation and processing by rubbing; FIG. 2 is an enlarged view of a rubbing material used therefor; and FIG. 3 is an enlarged view of rayon fibers.

FIG. 4 is an explanatory view showing the process for orientation and processing by rubbing; and FIG. 5 is an enlarged view of a rubbing material used therefor.

DETAILED DESCRIPTION OF THE EMBODIMENTS

One embodiment of the present invention will be described with reference to FIGS. 1 to 3.

Figure 1:
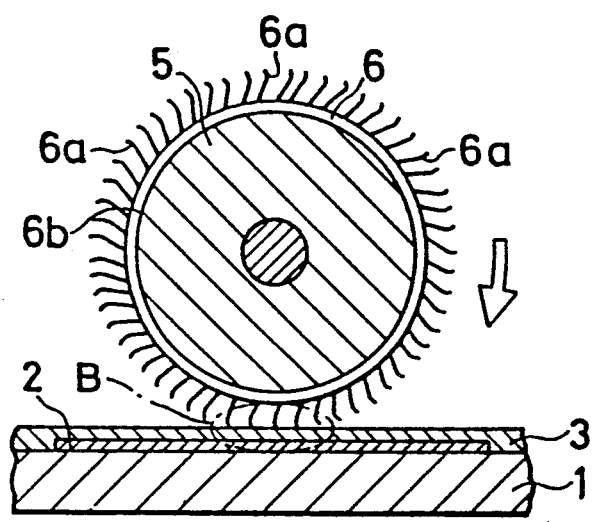
FIGS. 1 to 3 show one embodiment of the present invention.

FIG. 1 shows the process for orientation and processing by rubbing according to the present embodiment. An orienting film 3 for covering a transparent electrode 2 is formed on a glass substrate 1. Thereafter, a roller 5 having a rubbing material 6 wound on the outer peripheral surface thereof is rotated at a high speed whereby the surface of the orienting film 3 is subjected to rubbing by fibers 6a of the rubbing material 6.

Figure 2:
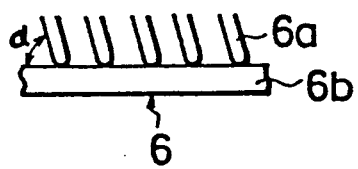

This rubbing material 6 comprises a velvet-like cloth in which fibers 6a formed from rayon fibers, polyester fibers, nylon fibers or the like are uprightly woven into a base cloth 6b formed from warps and wefts, as shown in FIG. 2. Each fiber 6a is somewhat inclined toward the left in the figure with respect to the vertical direction of the base cloth 6b. An upright angle α is set, for example, from 70 to 85 degrees. The length of the fiber 6a is approximately 1.2 mm.

The rubbing material 6 is secured to the outer peripheral surface of the roller 5 in the state where the fibers 6a are inclined in the rotational direction (the direction indicated by the arrow in FIG. 1) of the roller 5. As shown at a portion (B) of FIG. 1, only the tips of the fibers 6a slidably move on the orienting film 3 to effect rubbing. That is, since the upright direction of the fibers 6a with respect to the outer peripheral surface of the roller 5 is somewhat inclined in the rotational direction of the outer peripheral surface of the roller 5, positive rubbing can be carried out even if the sliding distance of the fibers 6a on the orienting film 3 is not long. The contact pressure during rubbing can be set to a moderate value. As a result, there is no fear that deep and large scratches are produced on the surface of the orienting film 3 during rubbing to avoid unevenness of orientation. Orientation of a high tilt angle can be made.

Figure 3:
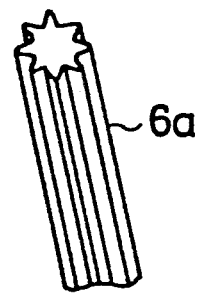
Figure 4:
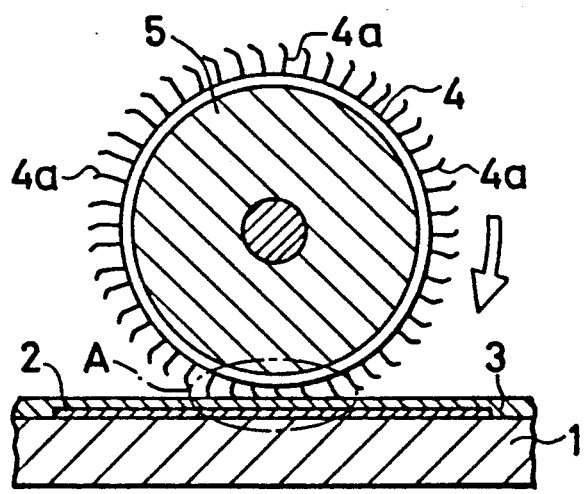
FIGS. 4 and 5 shows a conventional example.
Figure 5:
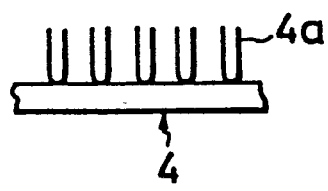

Particularly in the case where rayon fibers are used for the fibers 6a, a sectional shape of the rayon fiber is star-like as shown in FIG. 3, and a plurality of grooves are formed in the outer peripheral surface thereof. When rubbing is carried out by the rubbing material 6 having the fibers 6a standing upright as described above, fine rugged portions can be formed on the surface of the orienting film 3 and minute orientation is obtained to render possible volume production of S-TN type LCDs which orientation condition is extremely excellent.

As described above, according to the present invention, the upright direction of the fibers of the rubbing material are inclined in the rotational direction of the roller, and the sliding distance of the fibers on the orienting film is reduced and positive rubbing can be carried out under the moderate contact pressure. Therefore, the deep and large scratches are not possibly made on the surface of the orienting film, and the unevenness of orientation can be avoided to render possible orientation of the high tilt angle. Particularly when the rayon fiber is used, minute orientation is obtained, thus providing a method for orientation and processing by rubbing which can greatly contribute to the high duty of S-TN type LCD, large size of display surface, improvement of volume production and the like.

What is claimed is:

1. A method for orienting a liquid crystal display element by rubbing, comprising:

forming an orienting film for covering a transparent electrode on a substrate;

rotating on said substrate a roller having a rubbing material wound on the outer peripheral surface thereof with a number of fibers standing in an upright direction; and rubbing said orienting film with said fibers, wherein the upright direction of said fibers with respect to the outer peripheral surface of said roller is inclined in a rotational direction of said roller.

2. The method according to claim 1, wherein said fibers comprise rayon fibers.

* * * * *